United States Patent
Belaiche

(10) Patent No.: US 9,401,777 B2
(45) Date of Patent: *Jul. 26, 2016

(54) COMMUNICATION APPARATUS FOR COMMUNICATING DATA CONVEYED BY A PLURALITY OF TRANSPORT CHANNELS

(75) Inventor: Vincent Belaiche, Vitre (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 691 days.

This patent is subject to a terminal disclaimer.

(21) Appl. No.: 11/929,427

(22) Filed: Oct. 30, 2007

(65) Prior Publication Data

US 2008/0056310 A1 Mar. 6, 2008

Related U.S. Application Data

(60) Division of application No. 11/392,507, filed on Mar. 30, 2006, now abandoned, which is a continuation of application No. 10/772,237, filed on Feb. 6, 2004, now Pat. No. 7,133,388, which is a division of application (Continued)

(30) Foreign Application Priority Data

Apr. 21, 1999 (FR) ....................... 99 05047
Jun. 23, 1999 (FR) ....................... 99 08041

(51) Int. Cl.
*H04L 12/26* (2006.01)
*H04L 1/00* (2006.01)
(Continued)

(52) U.S. Cl.
CPC .............. *H04L 1/0041* (2013.01); *H04J 13/00* (2013.01); *H04L 1/00* (2013.01); *H04L 1/0009* (2013.01);
(Continued)

(58) Field of Classification Search
CPC .......... H04W 28/18; H04B 7/26; H04J 13/00; H04L 1/0009; H04L 1/0069

USPC .......... 370/329, 335, 345; 714/755, 777–792, 714/796
See application file for complete search history.

(56) References Cited

U.S. PATENT DOCUMENTS

| 4,613,990 A | 9/1986 | Halpern |
| 4,736,372 A | 4/1988 | Mueller |

(Continued)

FOREIGN PATENT DOCUMENTS

| CN | 1125026 A | 6/1996 |
| CN | 1132010 A | 9/1996 |

(Continued)

OTHER PUBLICATIONS

Antti Toskala, et al., "Frames FMA2 Wideband-CDMA for UMTS", vol. 9, No. 4, XP-000778096, Jul. 1, 1998, pp. 325-335.

(Continued)

*Primary Examiner* — Steven H Nguyen
(74) *Attorney, Agent, or Firm* — Oblon, McClelland, Maier & Neustadt, L.L.P.

(57) ABSTRACT

A communication apparatus for communicating data conveyed by a plurality of transport channels, the data of the transport channels being multiplexed into at least one multiplexing frame, includes a processing unit. The processing unit transforms an input data block of an initial size into an output data block of a final size in accordance with a rate matching ratio of the final size to the initial size, transmits information on a maximum payload of the at least one multiplexing frame the communication apparatus can send, receives a first parameter relative to the rate matching ratio, and calculates the final size, according to the initial size of the input data block, the first parameter, a second parameter and the maximum payload of the at least one multiplexing frame. The second parameter is representative of a maximum puncture rate and is a predefined parameter for calculating the final size.

2 Claims, 4 Drawing Sheets

Related U.S. Application Data

No. 10/359,705, filed on Feb. 7, 2003, now Pat. No. 7,027,422, which is a division of application No. 09/930,469, filed on Aug. 16, 2001, now Pat. No. 6,545,983, which is a division of application No. 09/553,064, filed on Apr. 20, 2000, now Pat. No. 6,501,748.

(51) Int. Cl.
| | | |
|---|---|---|
| *H04J 13/00* | (2011.01) | |
| *H04L 1/08* | (2006.01) | |
| *H04L 5/02* | (2006.01) | |

(52) U.S. Cl.
CPC ............ *H04L 1/0025* (2013.01); *H04L 1/0067* (2013.01); *H04L 1/0068* (2013.01); *H04L 1/0071* (2013.01); *H04L 1/0075* (2013.01); *H04L 1/08* (2013.01); *H04L 5/023* (2013.01); *H04L 1/0072* (2013.01)
USPC .......................................... 370/252; 714/755

(56) References Cited

U.S. PATENT DOCUMENTS

| | | | |
|---|---|---|---|
| 5,212,687 | A | 5/1993 | De La Bourdonnaye |
| 5,541,955 | A | 7/1996 | Jacobsmeyer |
| 5,742,622 | A | 4/1998 | Claydon et al. |
| 5,757,813 | A | 5/1998 | Raith |
| 5,796,757 | A | 8/1998 | Czaja |
| 5,909,434 | A | 6/1999 | Odenwalder et al. |
| 5,982,813 | A | 11/1999 | Dutta et al. |
| 5,983,384 | A | 11/1999 | Ross |
| 6,166,667 | A | 12/2000 | Park |
| 6,272,183 | B1 | 8/2001 | Berens et al. |
| 6,307,867 | B1 * | 10/2001 | Roobol et al. ................ 370/470 |
| 6,370,669 | B1 | 4/2002 | Eroz et al. |
| 6,389,000 | B1 | 5/2002 | Jou |
| 6,473,442 | B1 * | 10/2002 | Lundsjo et al. ............... 370/537 |
| 6,501,748 | B1 * | 12/2002 | Belaiche ....................... 370/342 |
| 6,510,137 | B1 | 1/2003 | Belaiche |
| 6,545,983 | B2 * | 4/2003 | Belaiche ....................... 370/252 |
| 7,027,422 | B2 * | 4/2006 | Belaiche ....................... 370/335 |
| 7,133,388 | B2 * | 11/2006 | Belaiche ....................... 370/335 |
| 2001/0022806 | A1 | 9/2001 | Adachi |
| 2004/0208146 | A1 | 10/2004 | Klein et al. |
| 2008/0056203 | A1 | 3/2008 | Belaiche |
| 2008/0056204 | A1 | 3/2008 | Belaiche |
| 2008/0056309 | A1 | 3/2008 | Belaiche |
| 2008/0063014 | A1 | 3/2008 | Belaiche |
| 2009/0003302 | A1 | 1/2009 | Klein et al. |

FOREIGN PATENT DOCUMENTS

| | | |
|---|---|---|
| EP | 0/327 101 A2 | 8/1989 |
| EP | 0 627 827 | 12/1994 |
| EP | 0 892 579 | 1/1999 |
| EP | 1 169 802 B1 | 1/2002 |
| EP | 1 494 384 B1 | 1/2008 |
| JP | 6-54874 | 7/1994 |
| JP | 2664365 | 6/1997 |
| JP | 9-233022 | 9/1997 |
| JP | 10-261980 | 9/1998 |
| JP | 2001-57521 | 2/2001 |
| JP | 2001-514457 A | 9/2001 |
| JP | 3617480 | 11/2004 |
| WO | WO 94/29985 A1 | 12/1994 |
| WO | WO 95/09493 A1 | 4/1995 |
| WO | WO 96/06487 A1 | 2/1996 |
| WO | WO 98/11677 | 3/1998 |
| WO | WO 99/11009 | 3/1999 |
| WO | WO 99/65148 | 12/1999 |
| WO | WO 00/62465 | 10/2000 |

OTHER PUBLICATIONS

Christiaan Roobol, et al., "A proposal for an RLC/MAC Protocol for Wideband CDMA Capable of Handling Real Time and Non Real Time Services", Vehicular Technology Conference, XP-010287797, May 18, 1998, pp. 107-111.
Mitsubishi Electric, A rule to determine the rate matching ratio, 3GPP RAN WG1 Meeting #5 TSGR1#5(99)538, May 12, 1999, 5 pages.
Lucent Technologies, "A unifying code proposal for all data rates, block sizes and Quality of Service: Performace/Complexity trade-off", TSGR1#3(99)189, 3GPP, Mar. 26, 1999.
Japanese Office Action issued Sep. 11, 2012, in Patent Application No. 2010-158166 (with English-language translation).
"Discussion on rate matching block in relation with service specific coding", Nortel Networks, RAN WG1 Meeting #1, TSGR1 #2 (99)119, Mar. 8, 1999, 5 pages.
"Similarities and differences among TTA, ARIB and ETSI layer1 Proposals", TTA, 3GPP TSG-RAN WG1, #1(99)012, Jan. 21-22, 1999, 4 pages.
"Layer one considerations for the Speech services", Nortel Networks, TSG-RAN Working Group 1 Meeting #3, (99)248, Mar. 22-26, 1999, 4 pages.
"Towards a limited number of slotted mode formats", Mitsubishi Electric ITE, 3GPP TSG RAN WG1, R1-99246, Mar. 22-26, 1999, 8 pages.
Chinese Office Action Issued Jul. 3, 2012 in Patent Application No. 200610099718.6 (with English translation).
Japanese Office Action issued Jun. 5, 2012 in patent application No. 2010-158166 with English translation.
Siemens, "Text proposal for S1.22: 'Multiplexing and channel coding (TDD)'", TSG-RAN Working Group1 meeting #4 TSGR1#4 (99)375, Apr. 20, 1999, pp. 8-17.
Siemens, "Multiplexing, channel coding and interleaving for TDD", TSG-RAN Working Group 1 meeting #3 TSGR#1(99)162, Mar. 26, 1999, pp. 1-4.
Lgic, "Puncturing Algorithm for Turbo Code", 3GPP TSG-RAN Working Group 1 (Radio) meeting #4 TSGR1#4(99) 338, Apr. 20, 1999, pp. 1-6.
"Proposal for Combined Static- and Dynamic Rate Matching", ETSI STC SMG2 UMTS L1 #7, Stockholm, Sweden, Oct. 14-16, 1998, Tdoc SMG2 UMTS-L1 430/98, pp. 1-4.
Office Action issued Nov. 26, 2013 to Japanese Patent Application No. 2012-168278, with English translation.
Office Action issued Dec. 10, 2013 to Japanese Patent Application No. 2012-247626, with English translation.
Tadao Saito et al., "An Evaluation of Acknowledgement Methods for Highspeed Data Transmissions", The Institute of Electronics, Information and Communication Engineers, vol. J 76-B-I No. 2, pp. 138-149, Feb. 1993.
Office Action issued Nov. 10, 2015 in Japanese Patent Application No. 2015-045852.

* cited by examiner

COMMUNICATION APPARATUS FOR COMMUNICATING DATA CONVEYED BY A PLURALITY OF TRANSPORT CHANNELS

CROSS-REFERENCE TO RELATED APPLICATIONS

The present application is a division of application Ser. No. 11/392,507, filed on Mar. 30, 2006; which is a continuation of application Ser. No. 10/772,237, filed on Feb. 6, 2004; which is a division of Ser. No. 10/359,705, filed on Feb. 7, 2003; which is a division of Ser. No. 09/930,469, filed on Aug. 16, 2001; and which is a division of Ser. No. 09/553,064, filed on Apr. 20, 2000, which claims priority to French Application No. 99 05047, filed on Apr. 21, 1999 and French Application No. 99 08041, filed on Jun. 23, 1999, the entire contents of each of which is incorporated herein by reference.

BACKGROUND OF THE INVENTION

1. Field of the Invention

The present invention relates to a communication apparatus for communicating data conveyed by a plurality of transport channels, the data of the transport channels being multiplexed into at least one multiplexing frame, includes a processing unit. The processing unit transforms an input data block of an initial size into an output data block of a final size in accordance with a rate matching ratio of the final size to the initial size, transmits information on a maximum payload of at least one multiplexing frame the communication apparatus can send, receives a first parameter relative to the rate matching ratio, and calculates the final size, according to the initial size of the input data block, the first parameter, a second parameter and the maximum payload of the at least one multiplexing frame. The second parameter is representative of a maximum puncture rate and is a predefined parameter for calculating the final size.

2. Discussion of the Background

The 3GPP ($3^{rd}$ Generation Partnership Project) group is an association whose members originate from several regional standardization bodies including in particular the ETSI (European Telecommunication Standardization Institute) and the ARIB (Association of Radio Industries and Businesses). Its object is the standardization of a third-generation telecommunication system for mobiles. One of the fundamental aspects distinguishing third-generation from second-generation systems is that, apart from the fact that they will use the radio spectrum more efficiently, they will allow very great flexibility of service. Second-generation systems offer an optimized radio interface for certain services. For example GSM (Global System for Mobiles) is optimized for the transmission of speech (telephony). Third-generation systems will offer a radio interface adapted for all kinds of services and combinations of services.

One of the issues at stake with third-generation mobile radio systems is that of efficiently multiplexing, on the radio interface, services which do not have the same demands in teams of quality of service (QoS). Quality of service is defined, conventionally, according to at least one criterion comprising in particular a processing delay, a bit error rate and/or an error rate per transported block. These different qualities of service require corresponding transport channels having different channel codings and channel interleavings. Moreover, they demand different maximum bit error rates (BER). For a given channel coding, the demand with regard to the BER is satisfied when the coded bits have at least a certain coding-dependent ratio Eb/I. The ratio Eb/I expresses the ratio of the average energy of each coded bit to the average energy of the interference.

It follows that the different qualities of service do not have the same demand in terms of the ratio Eb/I. Now, in a system of the CDMA (Code Division Multiple Access) type, the capacity of the system is limited by the level of interference. It is therefore necessary to fix the ratio Eb/I as correctly as possible for each service. Therefore, a rate matching operation, for balancing the ratio Eb/I is necessary between the various services. Without this operation the ratio Eb/I would be fixed by the service having the greatest demand, and as a result the other services would have "too good" a quality, thereby impacting directly on the capacity of the system.

This raises a problem since it is necessary in some manner that the rate matching ratios be defined identically at the two ends of the radio link.

The present invention relates to a configuring method for defining rate matching ratios identically at the two ends of a CDMA radio link.

In the OSI model (Open System Interconnection) from the ISO (International Standardization Organization), a telecommunication equipment is modelled by a layered model constituting a stack of protocols where each level is a protocol supplying a service to the level above. Level 1 is in particular responsible for implementing channel coding and channel interleaving. The service supplied by level 1 is referred to as "transport channels". A transport channel allows the higher level to transmit data with a certain quality of service. The quality of service is in particular characterized by the delay and the BER.

In order to satisfy the quality of service demand, level 1 uses a certain encoding and a suitable channel interleaving.

The known solutions, and in particular those proposed in the 3GPP project, will be described with regard to FIGS. 1 and 2.

Figure 1:
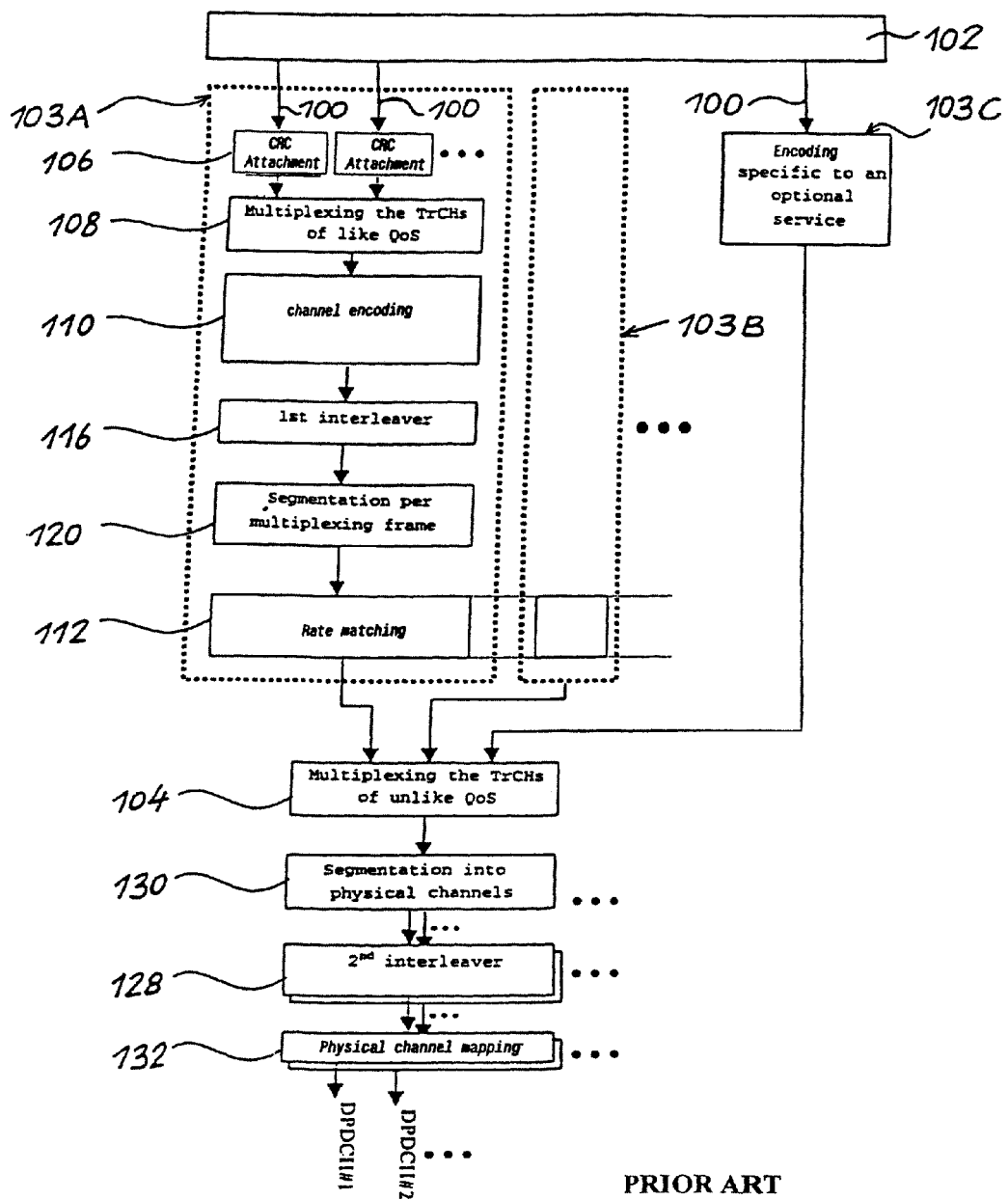
FIG. 1 is a diagrammatic view illustrating the multiplexing of the transport channels on the uplink in the current 3GPP proposal.
Figure 2:
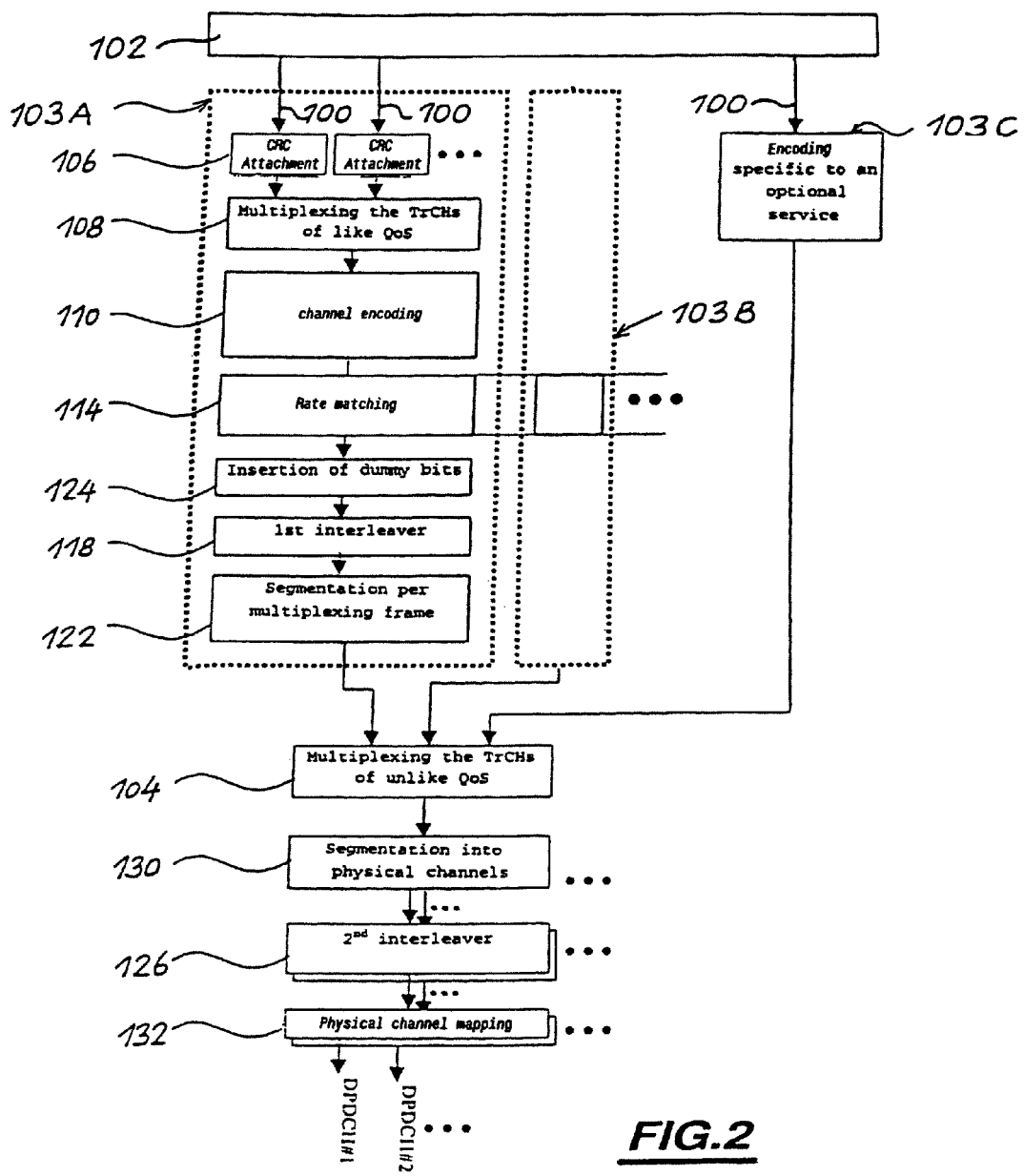
FIG. 2 is a diagrammatic view illustrating the multiplexing of the transport channels on the downlink in the current 3GPP proposal.

Represented in FIGS. 1 and 2 are the block diagrams for interleaving and multiplexing as defined by the current proposal by the 3GPP group, although this proposal has not yet been finalized.

In these figures, similar blocks bear the same numbers. In both cases the uplink (from the mobile station to the network) may be distinguished from the downlink (from the network to the mobile station), and only the transmission part is represented.

Each transport channel, labelled 100, periodically receives a transport blocks set from an higher level, labelled 102. The number of transport blocks 100 in this set, as well as their sizes, depend on the transport channel. The minimum period at which the transport blocks set is supplied corresponds to the time span of the interleaving of the transport channel. The transport channels with one and the same quality of service (QoS) are processed by one and the same processing chain 103A, 103B.

In each of the processing chains 103A, 103B, the transport channels, in particular after channel encoding and channel interleaving, are multiplexed together by concatenation in step 104. This multiplexing is carried out per multiplexing frame. A multiplexing frame is the smallest unit of data for which demultiplexing may be carried out at least partially. A multiplexing frame typically corresponds to a radio frame.

The radio frames form consecutive time intervals synchronized with the network, and numbered by the network. In the proposal by the 3GPP group, a radio frame corresponds to a duration of 10 ms.

The 3GPP proposal comprises the service-specific coding and interleaving option represented diagrammatically at 103C. The possibility of such an option is being considered at present since its indispensability or otherwise has not yet been determined.

In the general case, a processing chain 100A firstly comprises a step 106 during which a bit word termed the FCS (Frame Check Sequence) is attached to each transport block. The bit word FCS is typically calculated by the so-called CRC technique (Cyclic Redundancy Check) which consists in considering the bits of the transport block to be the coefficients of a polynomial P and in calculating the CRC from the remainder of the polynomial (P+P0) after dividing by a so-called generating polynomial G, where P0 is a predefined polynomial for a given degree of P. The attachment of the bit word FCS is optional, and certain transport channels do not include this step. The exact technique for calculating the bit word FCS also depends on the transport channel, and especially on the maximum size of the transport blocks. The usefulness of the bit word FCS is in detecting whether the transport block received is valid or corrupted.

The next step 108 consists in multiplexing together the transport channels (TrCH) of like quality of service (QoS). This is because those transport channels which have the same quality of service may use the same channel coding. Typically, the multiplexing at 108 is carried out by concatenating the transport blocks sets with their FCS for each transport channel.

The next step, labelled 110, consists in performing the channel encoding. On exit from the channel encoder 110 there is a set of coded blocks. Typically, in the case of a convolutional code, we have either zero or a single coded block of variable length. The length is given by the formula:

$$N_{output} = N_{input}/(\text{coding rate}) + N_{tail}(\text{length of the coded block}).$$

with:
$N_{output}$=number of bits at output (length of the coded block);
$N_{input}$=number of bits at input;
coding rate=constant ratio; and
$N_{tail}$=fixed quantity of information, independent of $N_{input}$, serving to empty the channel decoder cleanly at the time the coded block is received.

It is onwards of this step 110 that the uplink differs from the downlink.

In each transport channel, whether the uplink (FIG. 1) or the downlink (FIG. 2), a rate matching step is implemented after the channel encoding step 110. This step is labelled 112 for the uplink and 114 for the downlink. Rate matching is not necessarily performed immediately after channel encoding 110.

The objective of the rate matching step 112 or 114 is to balance the ratio Eb/I between the transport channels with different qualities of service. The ratio Eb/I gives the average energy of a bit with respect to the average energy of the interference. In a system using multiple access CDMA technology, the greater this ratio the greater is the quality which may be obtained. It will be understood therefore that transport channels having different qualities of service do not have the same need in terms of Eb/I, and that in the absence of rate matching, certain transport channels would have "too" good a quality of service relative to their respective needs, fixed as it is by the most demanding channel in terms of quality of service. Such transport channels would then needlessly cause interference. Rate matching therefore has a role of matching the Eb/I ratio. Rate matching is such that X bits at input give Y bits at output, thus multiplying Eb/I by the ratio Y/X, hence the matching capability. In what follows, the ratio Y/X is referred to as the rate matching ratio, also known as the rate matching ratio.

Rate matching is not done in the same way in the uplink and in the downlink.

This is because, in the uplink, it has been decided to transmit continuously, since discontinuous transmission worsens the peak/average ratio of the radio-frequency power at the output of the mobile station. The closer this ratio is to I the better. This is because, if this ratio is worsened (that is to say increased), this signifies that the power amplifier requires a greater margin (backoff) of linearity with respect to the mean operating point. On account of such a margin, the power amplifier would be less efficient and would therefore consume more for the same average power emitted, and this would in particular unacceptably reduce the mobile station's battery-powered endurance. Because it is necessary to transmit continuously on the uplink, the rate matching ratio Y/X cannot be constant. This is because the sum $Y_1 + Y_2 + \ldots Y_k$ of the numbers of bits after matching must be equal to the total number of bits in the radio frame for the data. This number may take only certain predefined values $N_1, N_2, \ldots, N_p$. It is therefore appropriate to solve the following system in k unknowns $Y_1, \ldots, Y_k$:

$$\begin{cases} \forall i \in \{1, \ldots, k\} Y_i = \lambda \cdot (Eb_i/I) \cdot X_i \\ Y_1 + \ldots + Y_k = N_j \\ \forall i \in \{1, \ldots, k\} \lambda \geq \dfrac{1-P}{Eb_i/I} \end{cases}$$

where $X_i$ and $Eb_i/I$ and $P_i$ are characteristic constants of each transport channel, and where it is sought to minimize $N_j$ from among the p possible values $N_1, N_2, \ldots, N_p$ (note: $P_i$ is the maximum allowable puncture rate for a coded transport channel).

Thus, in the uplink, the rate matching ratios Y/X for each transport channel are not constant from one multiplexing frame to the next, but are defined to within a multiplicative constant: the pairwise ratios between these ratios therefore remain constant.

In the downlink, the peak/average ratio of the radio-frequency power is in any case very poor since the network transmits to several users simultaneously. The signals destined for these users combine constructively or destructively, thereby inducing wide variations in radio-frequency power emitted by the network, and hence a poor peak/average ratio. It was therefore decided that for the downlink the balancing of Eb/I between the various transport channels would be done with a rate matching having a constant rate matching ratio Y/X, and that the multiplexing frames would be supplemented with dummy bits, that is to say bits which are not transmitted, that is to say discontinuous transmission.

Thus, the difference between the uplink and the downlink lies in the fact that in the uplink the rate matching 112 is dynamic so as to supplement the multiplexing frames, whereas in the downlink the rate matching 114 is static and the multiplexing frames are supplemented through the insertion of dummy bits in the immediately following step 124.

The rate matching, whether dynamic or static, is done either by repetition or by puncturing, according to an algorithm which was proposed to the ETSI by the Siemens Company (registered trade mark) in the technical document referenced SMG2/UMTS-L1/Tdoc428/98. This algorithm makes it possible to obtain non-integer puncture/repetition ratios, and it is given in Table 1 for information.

Input data:
  $X_i$            number of bits at input
  $Y_i$            number of bits at output
  $N_{pr} = Y_i - X_i$  number of bits to be repeated or to be
                   punctured (if $Y_i > X_i$ we repeat,
                   otherwise we puncture)
The puncturing/repetition rule is as follows:
  $e = 2*N_{p/r} - X_i$   initial error between the current and desired
                          puncture/repetition ratios
  $x = 0$                 index of the current bit
  while $x < X_i$ do
    if $e > 0$ then       test whether bit number x
                          should be repeated/punctured
    {puncture or repeat bit number x
     $e = e + (2*N_{p/r} - 2*X_i)$   update the error
    else
       $e = e + 2*N_{p/r}$   update the error
    end_if
    $x = x + 1$           next bit
  end_do The particular feature of this algorithm is that, when it operates in puncture mode, it avoids the puncturing of consecutive bits, but on the contrary tends to maximize the spacing between two punctured bits. As far as repetition is concerned, the repetition bits follow the bits which they repeat. Under these conditions, it will be understood that it is beneficial for the rate matching to be done before interleaving. This is because, for repetition, the fact that an interleaving follows the rate matching makes it possible to space the repeated bits apart. For puncturing, the fact that an interleaver precedes the rate matching gives rise to the risk that the rate matching might puncture consecutive bits on exit from the channel encoder.

It is therefore advantageous for the rate matching to be done as high up as possible, that is to say as close as possible to the channel encoder.

Moreover, each processing chain 103A, 103B also comprises, after the channel encoding step 110, a first interleaver labelled 116 for the uplink and 118 for the downlink, followed by a step of segmentation per multiplexing frame labelled 120 for the uplink and 122 for the downlink. The first interleaver 118 is not necessarily located immediately after the channel encoding 110.

For the downlink, it is possible to place the rate matching 114 right at the output of the channel encoding 110, since the rate matching ratio is constant. Hence, a priori only a single interleaver 118 is needed.

However, a second interleaver 136 is necessary, since the multiplexing of the transport channels of different qualities of service QoS is done by straight-forward concatenation, and since such a method would in fact limit the time span of each multiplexed block.

For the uplink the rate matching ratio may vary with each multiplexing frame. This explains the need for at least the first interleaver 116 before the rate matching 112 so as to distribute the bits of the coded block over several multiplexing frames, and for a second interleaver 128 placed after the rate matching so as to space apart the bits repeated by the rate matching 112.

Thus in the block diagrams of FIGS. 1 and 2 may be seen two interleavers referred to in the block diagrams as the first and second interleavers. The first interleaver 116, 118 is an interleaver whose time span is equal to the interleaving time span for the corresponding transport channel. This span may be longer than the duration of a multiplexing frame and is typically a multiple thereof in a constant ratio. This is why this first interleaver 116, 118 is also sometimes referred to as an inter-frame interleaver.

The second interleaver 126, 128 is also referred to as an inter-frame interleaver since its time span is that of a multiplexing frame.

Consequently the step of segmentation per multiplexing frame labelled 120, 122 is situated between the first 116, 118 and the second 128, 126 interleavers (when there is a second interleaver). This step consists in segmenting the blocks which are coded and are interleaved by the first interleaver into as many segments as is equal to the ratio of the time span of the first interleaver to the duration of a multiplexing frame. This segmentation is typically done in such a way that the concatenation of the segments once again yields the interleaved coded block.

It will be noted that, in the uplink, this segmentation step 120 is necessarily located before the rate matching 112. This is because the rate matching 112 is done according to a ratio established dynamically multiplexing frame by multiplexing frame, and it is not therefore possible to do it on a unit of data which may extend over several multiplexing frames.

In the uplink and the downlink, a step 130 of segmentation into physical channels is implemented before each second interleaver 126, 128. Likewise, the second interleavers 126, 128 are followed by a step 132 of physical channel mapping for transmission proper.

At present, only the multiplexing, channel encoding, interleaving and rate matching algorithms are defined and discussed. There is no rule making it possible to fix the way in which with a size X of a block input into the bit rate matcher there is associated a size Y of the block obtained on output. We are reduced to assuming that all the combinations of the pairs (X, Y) are predefined and saved in memory in a frozen manner. Only one of the following two things is possible:
  either the set of pairs (X, Y) remains frozen and no flexibility of definition of this set of pairs (X, Y) for the service concerned is obtained, which is contrary to the sought-after effect;
  or the set of pairs (X, Y) is negotiated between the mobile stations and the telecommunication network involved and a high number of signalling bits and hence additional immobilization of resources has to be envisaged.

A rule for determining the size Y of a rate matched block which is rate matched with the other blocks, on the basis of the size X of this block before rate matching is necessary at least in the uplink. This is because, since the services have variable bit rates, the number of transport blocks provided for each transport channel is variable. The list $(X_1, X_2, \ldots, X_k)$ of the sizes of blocks to be rate matched may consequently vary from multiplexing frame to multiplexing frame. Neither is the number k of elements in this list necessarily constant.

As the size $Y_i$ associated with the size $X_i$ does not depend only on $X_i$ but on the entire list $(X_1, X_2, \ldots, X_k)$ owing to the dynamic matching, it follows that there exists a list $(Y_1,$ $Y_2, \ldots, Y_k$) for each list ($X_1, X_2, \ldots, X_k$). The number of lists may therefore be very large, at least as large as the number of combinations of transport formats. A transport format combination is a quantity defining how to demultiplex the multiplexing frame.

Thus, the sending and receiving entities should employ the same association list ($X_1, X_2, \ldots, X_k$)→($Y_1, Y_2, \ldots, Y_k$). The signalling of this list of association between these two entities at the time of connection of the composite of coded transport channels represents a non-negligible cost in terms of signalling bits. A composite of coded transport channels includes at least two groups of coded transport channels. Moreover, it would then be necessary to provide for the exchange of a new list of associations ($X_1, X_2, \ldots, X_k$)→($Y_1, Y_2, \ldots, Y_k$) with each addition or removal included within the composite of coded transport channels.

Moreover, the exact matching of the ratio Eb/I depends on the technology of the channel decoder for each quality of service QoS. The performance of such a device can vary from one manufacturer to another depending on their respective know-how. In fact, this rate matching does not depend on the absolute performance of each decoder, but on their performance relative to one another, which may therefore vary from one manufacturer to another, if the performance of one of them varies.

It is not therefore possible for the sending and receiving entities employed to be able to "negotiate" the matching of the ratios (Eb/I) through an appropriate exchange of signalling messages.

To explain this, let us imagine two qualities of service A and B, and two manufacturers M and N, M and N have the same channel decoder for A, but M has a far more efficient decoder than that of N for B. It is then clear that manufacturer M could benefit from a smaller ratio Eb/I for B as this would decrease the total power required and would therefore produce a gain in capacity which would enable M to sell more mobile telecommunication equipments to network operators by arguing thus.

It would therefore be very useful to be able to signal parameters making it possible to define the rule X→Y for determining the size Y of a block after rate matching from the size X of the block before matching. This would make it possible to negotiate or to re-negotiate the proportions of the ratios Eb/I. This signalling must be as inexpensive as possible.

This adjustment during connection of the ratios Eb/I performed by the higher levels therefore signifies that if two telecommunication stations A and B wish to establish or modify a connection over which there is a service multiplexing, then they follow the following steps:

1. B signals to A what is the maximum load N of a multiplexing frame B can send.
2. A determines the ideal proportion for A of the ratios Eb/I from:
    the value of N received from B
    the maximum puncture rate allowed by A for each quality of service QoS,
    the relative demands for each quality of service QoS in terms of Eb/I
    the minimum performance demand specified for A.
3. A signals to B what proportion of the ratios Eb/I A expects.

Step 1 is not necessarily present. Systems may be imagined in which the maximum load is known in advance and forms part of the characteristics of the system. That said, such a system would be highly improbable in view of its lack of flexibility.

It may happen that the proportion of the ratios Eb/I which is determined by A is sub-optimal in relation to the sought-after aim which is that no transport channel should have more than it deserves. This is a compromise situation in which it is preferred to reduce the capacity of the network provided that the connection of the combination of services can be established.

Such a compromise is acceptable insofar as the degradation is within the limits fixed by the minimum performance demand defined in the system specification.

It may also happen that the actual tolerance limit is partly at the discretion of the network. This would make it possible to define non-guaranteed levels of service, in which the service is provided when the traffic conditions so permit, and otherwise it is re-negotiated downwards.

There will certainly be a specification of possible combinations of services. In this specification, for each combination of services, there will be associated a set of combinations of transport formats. This will definitely be the case for the basic services such as the conventional telephony service, and all the associated services such as call signalling, standby, etc.

However, the number of potential combinations may well increase in the future, and clear rules will then be needed in order for the higher levels to determine what combinations are possible, how to negotiate them, and/or to re negotiate them, and also in order for them to determine the set of transport format combinations for a given combination.

The higher levels ought therefore to be able with the aid of simple arithmetic algorithms to determine which combinations of transport formats are possible. To do this, there are at least three arithmetic rules which the higher levels should apply:

The first rule, concerning channel encoding, makes it possible to convert the number of elements of the transport blocks sets and their respective sizes into the number of elements of the sets of coded blocks and their respective sizes. For example, this rule may be of the type:

$$Y = X/(\text{coding rate}) + N_{tail}, \text{ where "coding rate" and}$$
$$\text{"}N_{tail}\text{" are characteristic constants of the code.}$$

The second rule concerning segmentation converts the size of a coded block into the size of a segment produced by the segmentation per multiplexing frame. In general this rule is a simple division by F when the transmission interval of the associated transport channel corresponds to F multiplexing frames. However, it is not yet clear whether the segmentation is equal or unequal. In the case of equal segmentation, the coded blocks have a size which is a multiple of F. In this case, all the segments are of the same size since there is no rounding error when dividing by F. In the case of unequal segmentation, the size of the segment is defined to within 1 bit, on account of the rounding-up or rounding-down error, and the serial number of the segment must be known in order to reduce the ambiguity. For example, if 80 bits are to be segmented into F equal to 8 frames, then all the segments will contain 10 bits and there is no need to know the serial number of the segment (or position of the segment) concerned in order to ascertain its size. On the other hand, if 78 bits are to be segmented into F equal to 8 frames, then 6 segments will contain 8 bits and two other segments will contain 9 bits and it is necessary to know the serial number of the segment in order to ascertain its size.

The third rule is that which makes it possible to deduce, from the size X of a block to be rate matched, the size Y of the rate matched block.

This third rule is not specified and the invention solves this problem of deducing the corresponding sizes for the blocks to be matched.

SUMMARY OF THE INVENTION

The aim of the invention is to ensure that each of the sending and receiving entities of a mobile telecommunication network can be aware, in a simple manner, for each transport channel associated with one and the same quality of service, of the size Y of a block obtained at the output of the rate matching means and associated with each quality of service, as a function of the size X of the block input to the matching means.

The aim of the invention is also to minimize the number of signalling bits making it possible to define, in a manner which is common to the sending and receiving entity or entities, the size Y of a block obtained at the output of the rate matching means and associated with the size X of a block input to these rate matching means.

A further aim of the invention is to preserve the flexibility of definition of the association of the sizes Y of blocks output by the rate matching means with the sizes X of blocks input to the rate matching means.

To this end, the subject of the invention is a communication apparatus for communicating data conveyed by a plurality of transport channels, said data of said plurality of transport channels being multiplexed into at least one multiplexing frame, said communication apparatus comprising a processing unit that executes a program to transform an input data block of an initial size into an output data block of a final size in accordance with a rate matching ratio of said final size to said initial size, and is configured to transmit, to another communication apparatus, information on a maximum payload of said at least one multiplexing frame that said communication apparatus can send, to receive a first parameter relative to said rate matching ratio, and to calculate said final size, according to said initial size of said input data block, the first parameter, a second parameter and said maximum payload of said at least one multiplexing frame, wherein said second parameter is representative of a maximum puncture rate that indicates a percentage of bits to be punctured and is a predefined, non-dimensional parameter for calculating said final size, and said apparatus includes a memory that stores said program.

The subject of this invention is also a method for a mobile station, said mobile station implementing a phase of communicating data conveyed by a plurality of transport channels, said data of said plurality of transport channels being multiplexed into at least one multiplexing frame, said data being rate-matched by transforming an input data block of an initial size into an output data block of a final size, said method comprising:

transmitting, to a base station, information on a maximum payload of said at least one multiplexing frame said mobile station can send;

receiving a first parameter, said first parameter being relative to a rate matching ratio of said final size to said initial size; and calculating, with the mobile station, said final size of said output data block on a basis of said initial size of said input data block, said first parameter, a second parameter, and said maximum payload of said at least one multiplexing frame, wherein said second parameter is representative of a maximum puncture rate that indicates a percentage of bits to be punctured and is a predefined, non-dimensional parameter for calculating said final size.

LIST OF FIGURES

Figure 3:
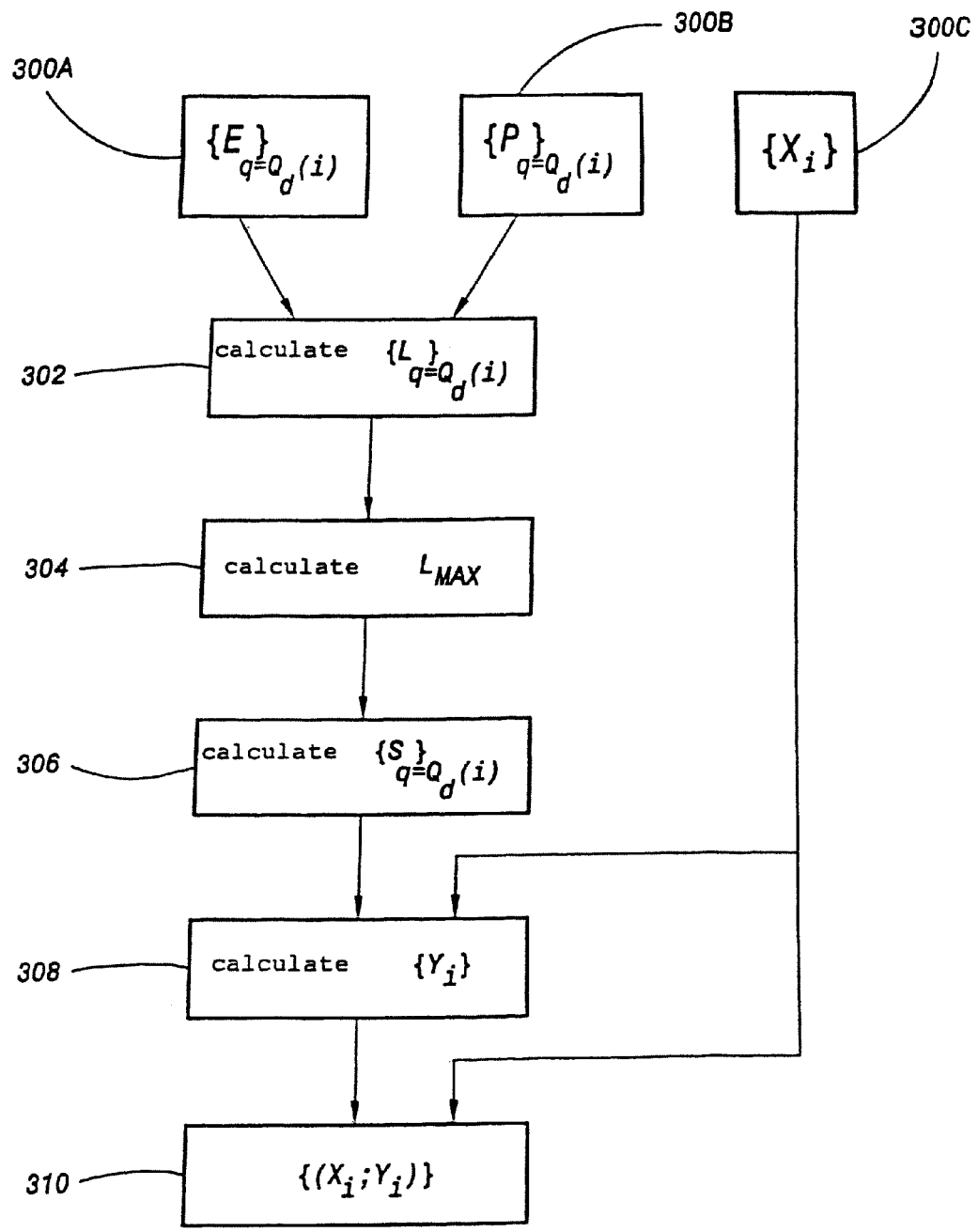
Figure 4:
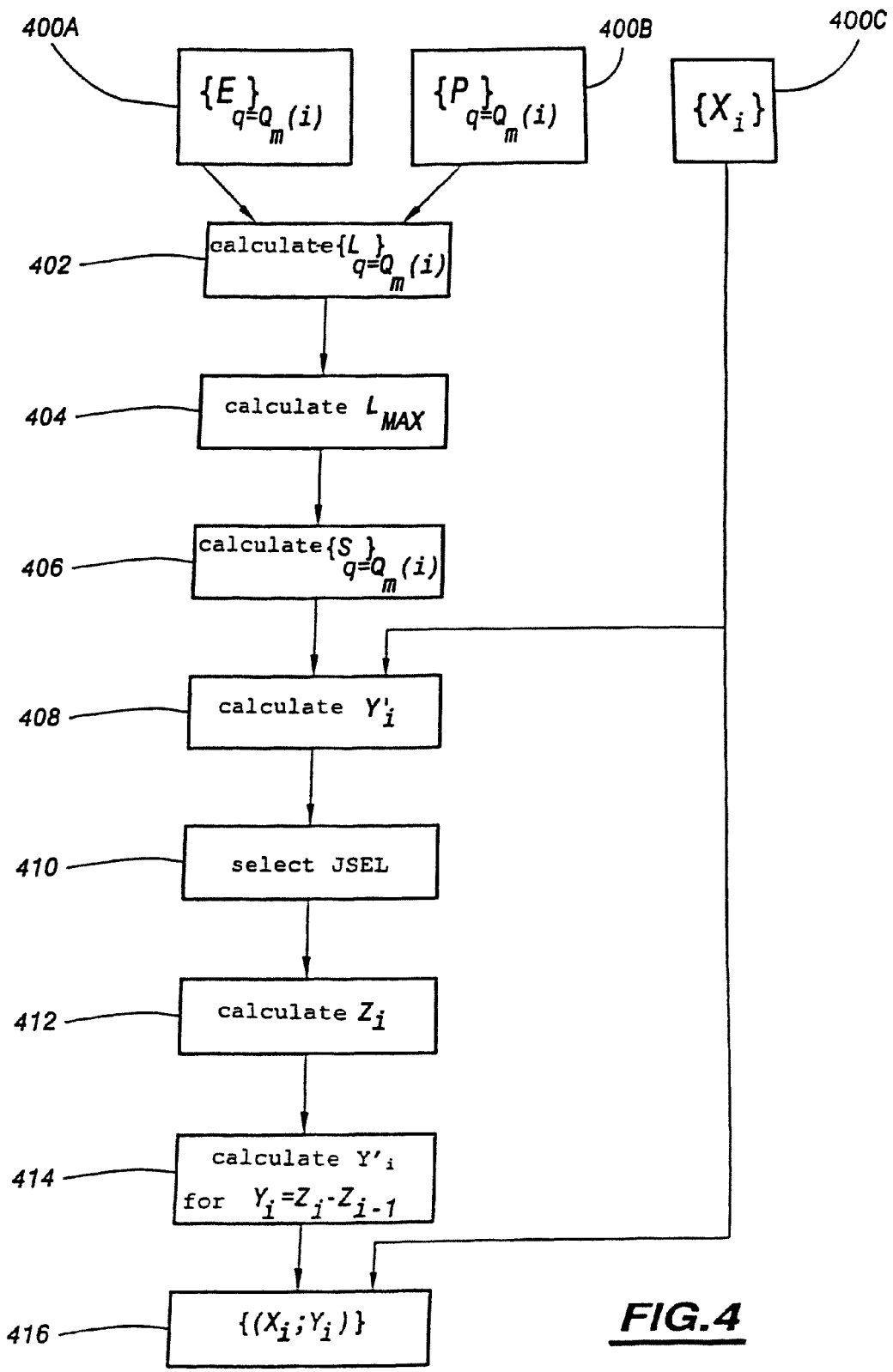

The invention will be better understood on reading the description which follows, given merely by way of example and with reference to the following drawings in which:

FIG. 1 is a diagrammatic view illustrating the multiplexing of the transport channels on the uplink in the current 3GPP proposal;

FIG. 2 is a diagrammatic view illustrating the multiplexing of the transport channels on the downlink in the current 3GPP proposal;

FIG. 3 is a flowchart explaining the implementation of the algorithm according to the invention for the downlink; and FIG. 4 is a flowchart explaining the implementation of the algorithm according to the invention for the uplink.

DETAILED DESCRIPTION OF THE INVENTION

Generally, in the invention each quality of service is characterized by two integer numbers E and P. E corresponds to the ratio Eb/I, that is to say if there are several qualities of service labelled 1, 2, . . . , p, whose respective coefficients E are labelled $E_1, E_2, \ldots, E_p$, then the ratios Eb/I of each quality of service will be in the same proportions as the coefficients $E_i$.

The coefficient P corresponds to the maximum puncture rate which is admissible for a given quality of service. Thus, for each quality of service 1, 2, . . . , p, there is associated a maximum puncture rate labelled $P_1, P_2, \ldots, P_p$. The maximum puncture rate is imposed by the channel coding implemented within the processing chain specific to the relevant quality of service. Puncturing consists in deleting coded bits. This deletion is tolerable insofar as the channel coding introduces a redundancy. However, the number of punctured bits must not be too large relative to the total number of bits coded, there is therefore a maximum puncture rate which depends on the channel coding as well as on the decoder used.

In a telecommunication system, a physical channel dedicated specifically to the transmission of control data is provided between the various sending and/or receiving entities of the system. In particular, such a channel exists between the fixed network and the mobile stations of a mobile radio communication system. The latter is commonly designated by DPCCH in the 3GPP standard (or Dedicated Physical Control Channel). It coexists alongside the physical data transmission channels designated DPDCH (or Dedicated Physical Data Channel) in this same standard.

According to the invention, to enable each entity of the telecommunication system to ascertain the set of correspondences between the sizes $Y_i$ of the rate matched blocks and the sizes $X_i$ of the blocks to be matched and to do so for each quality of service, only the pairs $(E_i, P)$ with $i \in [1,p]$ are transmitted over the logical control data transmission channel to all the entities of the system having to communicate with one another. These pairs may be established by one of the entities or "negotiated" between several entities in a first embodiment. In a second embodiment, only the parameters $(E_i)$ are negotiated and the parameters $(P_i)$ are predefined for a given channel encoding. In a third embodiment, only the parameters $(P_i)$ are negotiated and the set of parameters $(E_i)$ is predefined for a given group of transport channels. The method for determining the correspondences between the sizes of blocks $X_i, Y_i$ from the above-defined pairs $(E_i, P_i)$ will be described subsequently in the description.

Integer numbers are used for E and P since:

Calculations on integer numbers, or fixed-point calculations, are simpler to implement, stated otherwise they may be done faster or with fewer resources;

The accuracy of calculations on integer numbers can be very easily quantified through the number of bits of the registers in which these integers are stored. Thus, one may easily be assured that the same rounding errors are produced in the network and in the mobile station, and hence that the result of the calculations is exactly the same on either side of the radio interface.

More precisely, the dynamics are defined as follows:

E is an integer from 1 to EMAX,

P is an integer from 0 to PMAX.

Furthermore, we define the constant PBASE so that PMAX<PBASE, and so that $$\frac{P}{PBASE}$$

is the maximum admissible puncture rate for a given quality of PBASE service.

$$\frac{1}{PBASE}$$

corresponds to the granularity. PBASE is of the order of $10^4$.

The maximum admissible puncture rate $$\frac{P}{PBASE}$$

for the rate matching step carried out for a given quality of service is typically between 0 and 20%.

Thus, the algorithm of the invention is characterized by 3 integer constants EMAX, PMAX and PBASE.

In what follows, a fourth integer constant LBASE, concerned with the accuracy of the calculations, is used.

Let us note that although the same notation EMAX, PMAX, PBASE and LBASE is used for the uplink, that is to say from the mobile station to the network and for the downlink, that is to say from the network to the mobile station, the corresponding constants do not necessarily have the same value in both cases.

Also in what follows, the same notation X and Y is used for the uplink and for the downlink with different meanings.

Moreover, for each link we shall define a mapping denoted Q in both cases giving the value of the quality of service QoS for a given index of a block.

In the downlink, $X_1, X_2, \ldots, X_k$ denotes the list of possible sizes before rate matching for the blocks of a given quality of service (QoS), this being for all the possible values of quality of service (QoS).

To be more precise, if the quality of service QoS takes values from 1 to p, then:

$X_{k_0+1}, \ldots, X_{k_1}$ are all the possible block sizes for QoS 1
$X_{k_1+1}, \ldots, X_{k_2}$ are all the possible block sizes for QoS 2
...
$X_{k_{p-1}+1}, \ldots, X_{k_p}$ are all the possible block sizes for QoS p
with the convention that $k_0=0$ and $k_p=k_0$ and $k_1<k1<\ldots<k_p$.

Moreover, we consider a mapping Q from the set $\{1, \ldots k\}$ of indices of block sizes for every quality of service QoS to the set of indices $\{1, \ldots p\}$ of quality of services. We therefore have:

Q: $\{1, \ldots, k\} \to \{1, \ldots p\}$
$i \to Q(i)=j$ for $k_{j-1}<i \le k_j$ Note that in view of the above definitions, it is possible to have the same block size twice ($X_i=X_j$ with $i \ne j$) provided that the quality of service is not the same ($Q(i) \ne Q(j)$).

For the uplink, the blocks which are to be rate matched for a given multiplexing frame are numbered $1, 2, \ldots, k$ and $X_1, X_2, \ldots, X_k$ are their respective sizes.

Thus the list $(X_1, X_2, \ldots, X_k)$ varies from multiplexing frame to multiplexing frame. Its number k of elements is in particular not necessarily constant.

Q is a mapping from $\{1, \ldots, k\}$ to $\{1, \ldots, p\}$, which for the relevant multiplexing frame, associates with the index i of a block, its quality of service Q(i).

With this convention, it is possible to have the same block size twice ($X_i=X_j$ with $i \ne j$) whether or not they have the same quality of service ($Q(i)=Q(j)$ or $Q(i) \ne Q(j)$).

Indeed, for two blocks of like quality of service to have the same size, it is sufficient for the channel encoder to output a set of coded blocks having at least two elements of like size.

To summarize, for the downlink, $1, 2, \ldots, k$ are indices for all the possible sizes of blocks to be rate matched, given that the block sizes corresponding to different qualities of service are counted separately. For the uplink, $1, 2, \ldots, k$ are the indices of the list of blocks to be rate matched for a given multiplexing frame.

$Y_1, \ldots, Y_k$ are the sizes of blocks which correspond respectively to $X_1, \ldots, X_k$ after rate matching.

For the downlink, the algorithm for determining the sets of pairs $(X_i, Y_i)$ from the values $E_q$ and $P_q$ associated with the quality of service q is illustrated for one and the same processing chain ($Q_{d(i)}$) in FIG. 3 for example for an entity which receives the set of pairs of parameters ($E_q, P_q$) while negotiating the matching of the ratios of the average energy of a bit to the average energy of the interference (Eb/I). This entity may either be the sending entity (consisting of at least one base station) for the composite of transport channels, or the receiving entity (consisting of at least one mobile station) for this composite of transport channels, depending on the entity which decides the result of the current negotiation. In most cases, it is the receiving entity for the group of transport channels which decides and it is the sending entity which implements the configuring method of the invention.

Let us assume that for every quality of service q in $\{1, \ldots, p\}$, that is to say for each processing chain, we have the two characteristic integers $E_q$ and $P_q$ defined above. These are received in steps 300A and 300B borne by an already established transport channel. Additionally, the values $X_i$ are available, in step 300C, whether they are predefined for quality of service q, or whether they have been negotiated.

The first step 302 of the algorithm is to calculate for every q from 1 to p an integer parameter $L_q$ defined by:

$$L_q = \left\lfloor \frac{(PBASE - P_q) \cdot LBASE}{E_q} \right\rfloor$$

where $\lfloor x \rfloor$ represents the largest integer less than or equal to x. It is clear that, according to a variant embodiment, the smallest integer greater than or equal to x is selected.

In general, any other rounding function may be suitable for any step for determining a parameter where a rounding function is to be carried out. Furthermore, two steps for determining parameters may use two different and mutually independent rounding functions.

The next step labelled 304 consists in defining the parameter LMAX by:

$$LMAX = \max_q \{L_q\}$$

Next, an integer $S_q$ is defined in step 306 for every quality of service q by:

$$S_q = LMAX \cdot E_q$$

$S_q$ is such that the rational number $$\frac{Sq}{PBASE \cdot LBASE}$$

is the minimum rate matching ratio, given the maximum puncture rate $$\frac{Pq}{PBASE}$$

for each quality of service q.

Stated otherwise, $S_q$ must comply with the following relation:

$$\frac{S_q}{PBASE \cdot LBASE} \geq 1 - \frac{P_q}{PBASE}$$

The configuring method of the invention has the advantage according to which there is no need in particular within the context of an addition and/or a removal within the current composite of transport channels of at least one group of transport channels exhibiting the same quality of service or within the context of a modification of the ratio of the average energy of a bit to the average energy of the interference (Eb/I) which is sought for a given quality of service, to retransmit not the set of pairs of parameters $\{E_q, P_q\}$ for all the qualities of service used, but only the pair(s) of parameters $\{E_q, P_q\}$ associated with the group(s) of transport channels impacted by the addition and/or the modification of the ratio (Eb/I) sought.

The preceding part of the algorithm also applies in respect of the uplink. However, the end of the algorithm is specific to the downlink.

On completing step 306, the relation $X_i \rightarrow Y_i$ is defined in, step 308 by:

$$Y_i = \left\lceil \frac{S_{Q(i)} \cdot X_i}{PBASE \cdot LBASE} \right\rceil$$

where $\lceil x \rceil$ is the smallest integer greater than or equal to x.

Knowing each value of $X_i$ and of $Y_i$ which correspond, the set of pairs of sizes $(X_i, Y_i)$ are established in step 310.

To summarize, in the downlink, the algorithm essentially comprises the following four steps.

1. for all the QoS q do $L_q = \left\lfloor \frac{(PBASE - P_q) \cdot LBASE}{E_q} \right\rfloor$    (step 302)

2. $LMAX := \max_q \{L_q\}$    (step 304)

3. for all the QoS q do $Sq := LMAX \cdot E_q$    (step 306)

4. for $i := 1$ to k do $Y_i = \left\lceil \frac{S_{Q(i)} \cdot X_i}{PBASE \cdot LBASE} \right\rceil$    (steps 308-310)

For the uplink, the algorithm for determining the sets of pairs $(X_i, Y_j)$ from the values $E_q$ and $P_q$ associated with the quality of service q is illustrated for one and the same processing chain $(Q_{m(i)})$ in FIG. 4 for example for an entity which receives the set of pairs of parameters $\{E_q, P_q\}$ while negotiating the balancing of the ratio of the average energy of a bit to the average energy of the interference (Eb/I). This entity may either be the sending entity (consisting of at least one base station) for the composite of transport channels, or the receiving entity (consisting of at least one mobile station) for this composite of transport channels, depending on the entity which decides the result of the current negotiation. In most cases, it is the receiving entity for the composite of transport channels which decides and it is the sending entity which implements the configuring method of the invention.

For the uplink, the rate matching ratios are calculated for each multiplexing frame. Thus, it is not a question of determining a mapping $X_i \rightarrow Y_i$, but rather a mapping $(X_1, X_2, \ldots, X_k)(Y_1, Y_2, \ldots, Y_k)$; indeed, the sum of the $Y_i$ to $Y_k$ must be equal to the maximum payload of a multiplexing frame.

Moreover, the (potential) maximum payload of a multiplexing frame may vary from frame to frame depending on the physical resources to be used as a function of the amount of data to be transmitted (corresponding to the amount of input data for all the sizes $X_i$ to $X_k$ of the blocks transported). Hence, we can thus define a set $(N_1, \ldots, N_r)$ with, for example, $N_1 \leq \ldots \leq N_r$, of the possible maximum payloads for the multiplexing frames. More generally, the order 1, 2, . . . r of the indices of $N_1$, $N_2$ to $N_r$, corresponds to the order of preference of the physical resources allowing transmission of the various maximum payloads $\{N_1, N_2, \ldots N_r\}$.

To summarize, in the uplink, the algorithm essentially comprises the following seven steps:

Hence, one of the results of the algorithm for determining the rate matching is to select a set, identified by JSEL, of physical resources from $\{1, 2, \ldots r\}$ allowing transmission of a maximum payload $N_{JSEL}$ and to ensure that:

$$\sum_{i=1}^{k} Y_i = N_{JSEL} \quad (1)$$

For this purpose, two successive phases are implemented.

In the first phase, block sizes $Y'_i$ are determined "statically" in a similar manner to the case of the downlink. The steps of this phase are denoted by the same reference numerals as in FIG. 3 increased by 100. Hence, this is a mapping $X_i \rightarrow Y'_i$.

In a second phase, $N_{SJEL}$ and the $Y_i$ values corresponding to the $Y'_i$ values are determined "dynamically" so as to satisfy equation (1). Hence, this is a mapping $(Y'_1, Y'_2, \ldots Y'_k)(Y_1, Y_2, \ldots, Y_k)$.

The first phase consisting of steps 400 to 408 is defined simply by the equation:

$$Y'_i = S_{Q(i)} \cdot X_i.$$

Next, JSEL is determined in step 410 by the following equation:

$$JSEL = \min\left\{ j \,/\, \sum_{i=1}^{i=k} Y'_j \leq PBASE - LBASE \cdot N_j \right\}$$

Stated otherwise, if $N_1 \leq N_2 \ldots \leq N_r$, then the smallest maximum payload allowing transmission is selected.

Then, in step 412 we define integers $Z_0, Z_1, \ldots, Z_k$ corresponding to the value of the aggregate of the final size by:

$Y_i$, that is to say $Z_j = \sum_{i=1}^{i=j} Y_i$ $Z_0 := 0$ for $i := 1$ to $k$ do $Z_i := \left\lfloor \dfrac{\left(\sum_{j=1}^{j=i} Y'_j\right) \cdot N_{JSEL}}{\sum_{j=1}^{j=k} Y'_j} \right\rfloor$ where $\lfloor x \rfloor$ is the largest integer less than or equal to x.

Lastly, the $Y_i$ are calculated simply in step 414 from:

$Y_i = Z_i - Z_{i-1}$

In this way, it will be noted that the rounding error in calculating the final size ($Y_i$) is not aggregated. Thus, regardless of the number k of data blocks, only two roundings are to be carried out:

a first in respect of the value of the aggregate size denoted $Z_i$, and a second in respect of the value of the previous aggregate size denoted $Z_{i-1}$.

The sought-after pairs ($X_i$, $Y_i$) are finally obtained in step 416.

To summarize, in the uplink, the algorithm essentially comprises the following seven steps:

1. for all the $QoS$ $q$ do $L_q = \left\lfloor \dfrac{(PBASE - P_q) \cdot LBASE}{E_q} \right\rfloor$ (step 402)

2. $LMAX := \max_q \{L_q\}$ (step 404)

3. for all the $QoS$ $q$ do $Sq := LMAX \cdot E_q$ (step 406)

4. for $i := 1$ to $k$ do $Y'_i := S_{Q(i)} \cdot X_i$ (step 408)

5. $JSEL = \min\left\{j \Big/ \sum_{i=1}^{i=k} Y'_i \leq PBASE - LBASE \cdot N_j\right\}$ (step 410)

$Z_0 = 0$ 6. for $i := 1$ to $k$ do for $i := 1$ to $k$ do (step 412)

$Z_i := \left\lfloor \dfrac{\left(\sum_{j=1}^{j=i} Y'_j\right) \cdot N_{JSEL}}{\sum_{j=1}^{j=k} Y'_j} \right\rfloor$ 7. for $i := 1$ to $k$ do $Y_i := Z_i - Z_{i-1}$ (step 414)

To finish let us note that, although the concept of quality of service has been defined as the quality of service of a transport channel, that is to say by the quality of service offered by level 1 to the higher levels, it would be more correct, given that the object is the determination of the rate matching,to speak of the quality of service offered by the bottom of the interleaving and multiplexing chain to the channel encoder.

The embodiment presented above is not intended to limit the scope of the invention, and hence numerous modifications may (nevertheless) be made thereto without departing from the context thereof. In particular, it will be noted that the step for determining the pair of parameters $\{E_q, P_q\}$ may be performed not only per quality of service, but also per class of coded bits for one and the same quality of service. Indeed, it is recalled that certain channel encodings (such as in particular turbocoding) deliver various classes of coded bits which are more or less sensitive to puncturing.

What is claimed is:

1. A communication apparatus for communicating data with another communication apparatus, said communication apparatus comprising:
    a receiver that receives, from the another communication apparatus, a first parameter relative to a rate matching ratio that relates an output data block of a final size to an input data block of an initial size, the input data block being conveyed by a plurality of transport channels;
    a memory storing a program;
    a processing circuitry that executes the program to calculate said final size based on said initial size of said input data block, the first parameter, a second parameter, and a size of a maximum payload of said at least one multiplexing frame that said communication apparatus can send, the second parameter being representative of a maximum puncture rate that indicates a percentage of bits to be punctured and is a predefined, non-dimensional parameter for calculating said final size, and transform the input data block of the initial size into the output data block of the final size in accordance with the rate matching ratio of said final size to said initial size;
    a multiplexer that multiplexes the output data block into the at least one multiplexing frame so as to comprise data conveyed by the plurality of transport channels;
    a transmitter that transmits, to the another communication apparatus, information indicating the size of the maximum payload of said at least one multiplexing frame that said communication apparatus can send; and
    the transmitter transmits the multiplexed data to the another communication apparatus or the receiver receives data from the another communication apparatus as a rate matched data communication in accordance with the rate matching ratio.

2. A method for communicating data by a mobile station with a base station, said method comprising:
    receiving, at the mobile station from the base station, a first parameter relative to a rate matching ratio that relates an output data block of a final size to an input data block of an initial size, the input data block being conveyed by a plurality of transport channels;
    storing a program in a memory;
    executing the program on a processing circuitry to calculate said final size based on said initial size of said input data block, the first parameter, a second parameter, and a size of a maximum payload of said at least one multiplexing frame that said mobile station can send, the second parameter being representative of a maximum puncture rate that indicates a percentage of bits to be punctured and is a predefined, non-dimensional parameter for calculating said final size, and transform the input data block of the initial size into the output data block of the final size in accordance with the rate matching ration of said final size to said initial size;
    multiplexing the output data block in the at least one multiplexing frame so as to comprise data conveyed by the plurality of transport channels;
    transmitting, to the base station, information indicating the size of the maximum payload of said at least one multiplexing frame said mobile station can send; and transmitting the multiplexed data to the base station or receiving data from the base station as a rate matched data communication in accordance with the rate matching ratio.

* * * * *